UNITED STATES PATENT OFFICE.

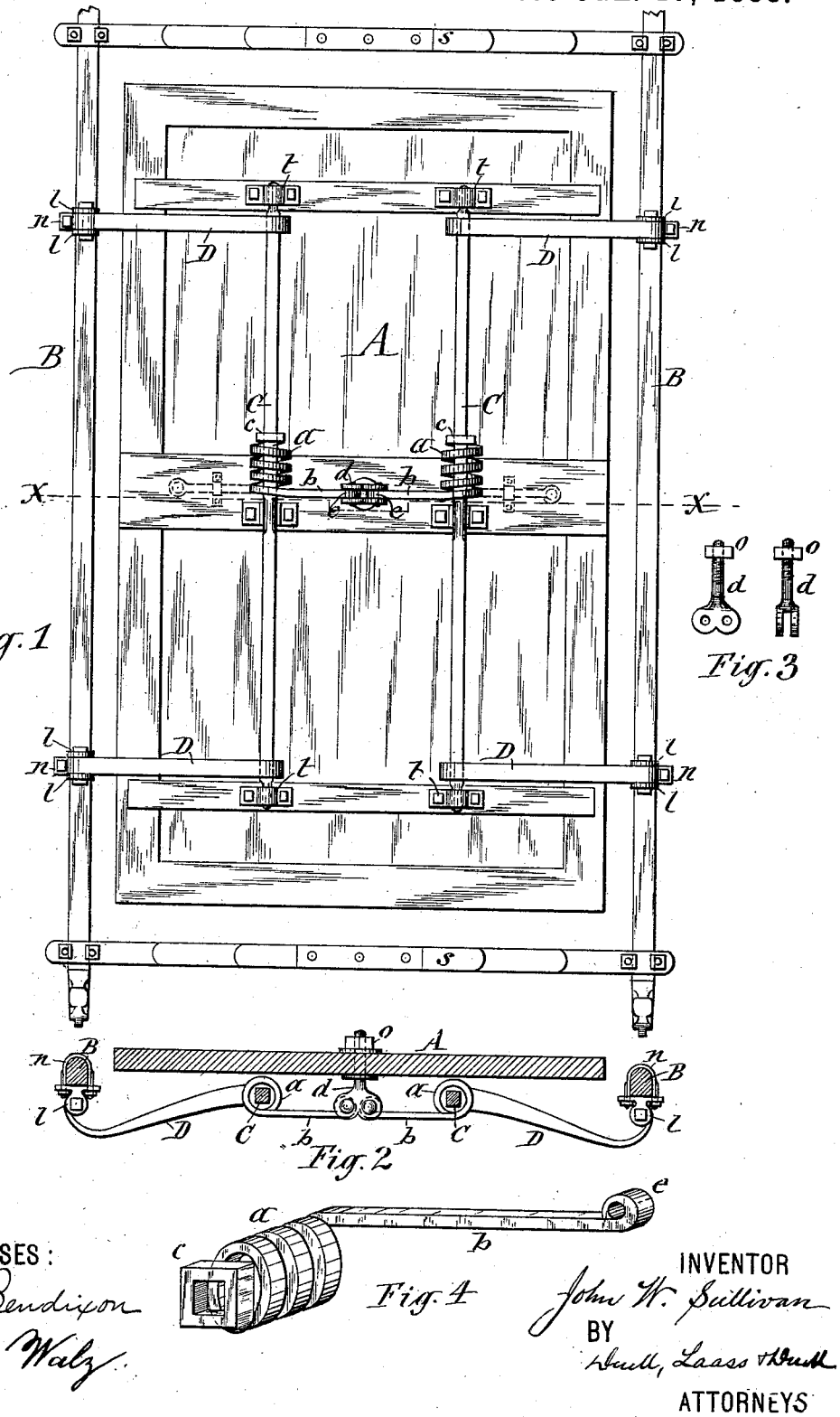

JOHN W. SULLIVAN, OF EAST BRIGHTON, NEW YORK.

VEHICLE-SPRING.

SPECIFICATION forming part of Letters Patent No. 376,614, dated January 17, 1888.

Application filed September 29, 1887. Serial No. 250,997. (No model.)

*To all whom it may concern:*

Be it known that I, JOHN W. SULLIVAN, of East Brighton, in the county of Monroe, in the State of New York, have invented new and useful Improvements in Vehicle-Springs, of which the following, taken in connection with the accompanying drawings, is a full, clear, and exact description.

This invention consists in a novel construction of a vehicle-spring which is simple and comparatively inexpensive in its manufacture, and strong, durable, and efficient in its operation, all as hereinafter more fully described, and specifically set forth in the claim.

In the annexed drawings, Figure 1 is an inverted plan view of a vehicle-body with my improved spring attached thereto. Fig. 2 is a vertical transverse section on line $x\,x$, Fig. 1. Fig. 3 is a detached view of the bolt which couples the two springs together and to the body of the vehicle, and Fig. 4 is an enlarged detached perspective view of one of the coil-springs employed in my improved vehicle-spring.

Similar letters of reference indicate corresponding parts.

A represents the body of the vehicle, and B B the side bars, which latter are mounted at or near their ends either on cross-springs $s\,s$, as shown, or on a hind bolster and head-block, as may be desired.

C" C" denote two stiff steel or iron bars, which are arranged parallel and lengthwise the under side of the body A, and pivoted in suitable boxes, $t\,t$, secured to the body, so as to allow said bars to turn about on their own axes. To each of said bars are rigidly secured two levers, D D, which extend laterally outward therefrom and are hung on the side bars, B B, by eyes on the ends of the levers, pivoted either directly to eyes $l\,l$ on clips $n$, secured to the side bars in the usual manner, or coupled to the eyes $l\,l$ by links, as may be desired.

The bars C C are restrained from turning by means of two separate and distinct coil-springs, $a\,a$, each of which embraces one of said bars and terminates in an eye at one end, $c$, by which it is rigidly secured to the bar. The opposite end of the coil-spring terminates in an arm, $b$, which extends tangentially therefrom, and is secured to the body. The coil-spring $a$, with its eye $c$ and arm $b$, I preferably form in one piece, as illustrated in Fig. 4 of the drawings; and I also prefer to employ a bar, C, which is square in cross-section, and form the eye $c$ also square, and of a size to allow it to be slipped onto the bar from the end thereof and to closely embrace said bar, so as to effectually prevent the eye from turning on the bar. Each of the arms $b$, I prefer to form with an eye, $e$, on its end, by which it is hinged to the lower end of a bolt, $d$, which passes vertically through the bottom of the body, and is screw-threaded and provided with a nut, $o$, on its upper end, by means of which nut the bolt can be raised or lowered, and thus the tension of the coil-springs be adjusted as may be desired.

It will be observed that said bolt not only secures the coils to the body of the vehicle, but also couples said coils together at the ends of the arms $b\,b$.

When a load is applied to the vehicle, the depression of the body A causes the levers D D to turn the bars C C in their bearings or boxes $t\,t$, which turning is resisted by the coil-springs $a\,a$, and thus the body is elastically supported.

I do not limit myself to the arrangement of the spring-arms $b\,b$ extending inward or reaching toward each other, as illustrated in full lines in the drawings, inasmuch as said arms may be extended outward or from each other and attached directly to the under side of the body, as indicated by dotted lines in Fig. 1 of the drawings.

What I claim as my invention is—

In combination with the body and side bars, the bars C C, pivoted to the under side of the body lengthwise thereof, the coil-springs $a\,a$, each terminating with the eye $c$ at one end, by which it is rigidly secured to one of the bars, and terminating at the opposite end with the arm $b$ and eye $e$ on the end of said arm, the bolt $d$, adjustably connected to the body and having its lower ends connected to the arms $b\,b$, and levers D D, rigidly secured to the bars C C and hung on the side bars, substantially as described and shown.

In testimony whereof I have hereunto signed my name, in the presence of two witnesses, at Syracuse, in the county of Onondaga, in the State of New York, this 26th day of September, 1887.

JOHN W. SULLIVAN. [L. S.]

Witnesses:
C. H. DUELL,
JOHN J. LAASS.